No. 800,366. PATENTED SEPT. 26, 1905.
C. W. FAITOUTE.
VEHICLE TIRE.
APPLICATION FILED AUG. 11, 1904.
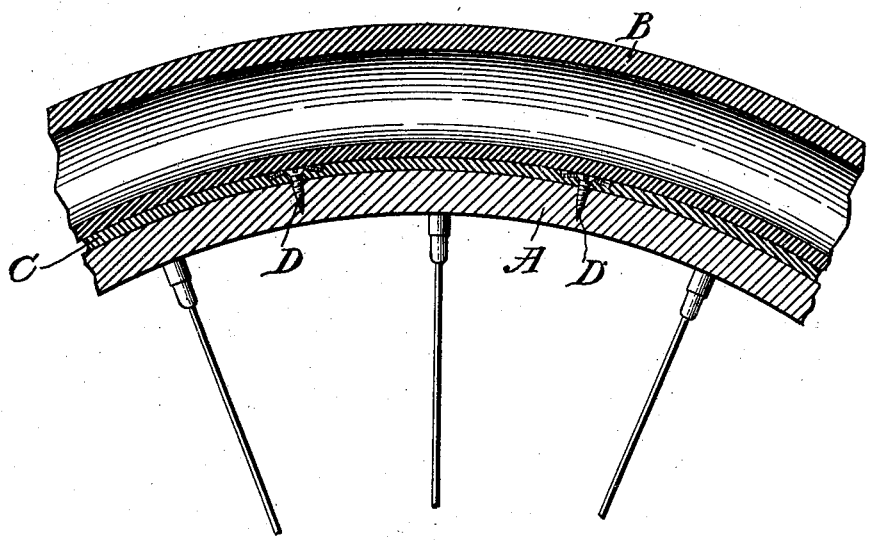
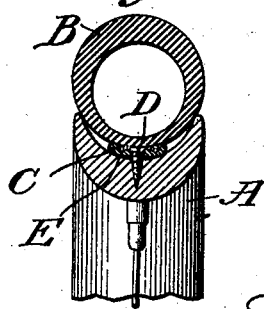
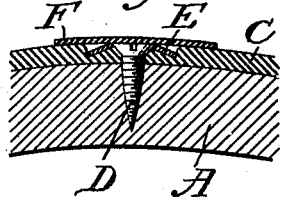 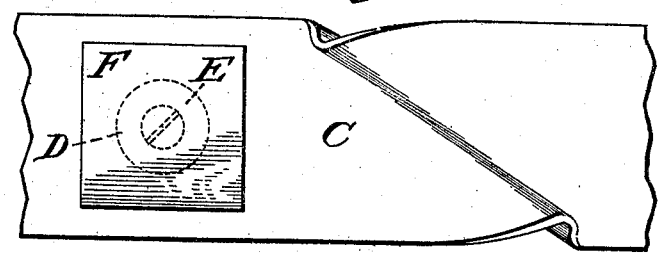
WITNESSES:
Chas. F. Clagett
Chas. L. Wolf
INVENTOR
Charles W. Faitoute.
BY
Charles A. Stephens
his ATTORNEY

UNITED STATES PATENT OFFICE.

CHARLES W. FAITOUTE, OF SUMMIT, NEW JERSEY.

VEHICLE-TIRE.

No. 800,366.  Specification of Letters Patent.  Patented Sept. 26, 1905.

Application filed August 11, 1904. Serial No. 220,324.

*To all whom it may concern:*

Be it known that I, CHARLES W. FAITOUTE, a citizen of the United States, and a resident of Summit, in the county of Union and State of New Jersey, have invented certain new and useful Improvements in Vehicle-Tires, of which the following is a specification.

This invention relates to vehicle-tires, the object being to provide a cushion for the tire extending around the rim between the tire and rim, which cushion shall be of such a material as to grip the tire and prevent the same from slipping or creeping without the use of cement or other fastening material. This cushion is secured to the rim permanently by any suitable means. The tire may be easily removed for repairs or any other purpose and replaced in position, where it will be held securely by this gripping-cushion. It is thus seen that by the use of this device the necessity of cementing the tire or otherwise securing the same to the rim is done away with and also the important feature of preventing the tire from slipping and creeping while in use is provided.

This invention has been tried experimentally by me on a bicycle-wheel and found to work very successfully under several severe tests.

Referring now to the drawings accompanying this specification, Figure 1 represents a partial sectional side view of a wheel-rim of ordinary construction, showing the band or cushion in place between the rim and tire. Fig. 2 is a cross-sectional view of a rim and tire, also showing the cushion in place. Fig. 3 is an enlarged sectional side view showing a preferred method of securing the cushion to the rim by means of a cup-shaped washer held by a screw, the head of the screw and washer being covered with a thin piece of rubber to prevent injury to the tire by coming in contact with the metal parts. Fig. 4 is a plan view of a section of a cushion or band, showing portions of the same overlapped to give a better gripping effect.

At A is shown a wheel-rim of ordinary construction, preferably of wood.

At B is shown a pneumatic tire of ordinary construction.

At C is shown a cushion which is of flexible material having a gripping-surface to hold the tire against creeping, as stated. It has been found by experiments made by me that the best results have been obtained by making this cushion of rubber and in the form of continuous bands around the rim of the wheel and located at the bottom of groove in the rim under the tire. By overlapping portions of this band, as shown in Fig. 4, a more efficient gripping-surface is provided. Any suitable means may be used to secure this band to the rim of the wheel, such as cement, nails, screws, &c. A preferred form is shown in Fig. 3, where I use an inverted-cup-shaped washer, such as shown at E, which is held in place by a screw D. On account of the yielding nature of the material used for the band or cushion this washer may be drawn down by the screw until the outer surface thereof is flush with the outer surface of the band, thus clamping and securely holding the band in place. A thin washer of rubber, such as F, may be provided to protect the tire from injury that might result with its being in direct contact with the metallic surface. The fastening-screws and cushion may be placed at suitable intervals around circumference of the rim and may be staggered on either side of the center line in order to insure the band being held securely in place. The size and thickness of this band or cushion will be varied to meet the several requirements and various uses to which vehicle-wheels of this description are put. It has been found to be a very simple and efficient means of avoiding a well-known difficulty that is met with in this class of vehicle-wheels.

Having now described my invention, what I claim as new, and desire to secure by Letters Patent, is—

1. The combination with a vehicle-tire, a band of flexible gripping material extending around the circumference of the wheel-rim between the rim and tire forming a cushion for said tire, a cup-shaped washer having a continuous lower edge and held by a suitable fastening clamping said band between said washer and rim, substantially as described.

2. The combination with a vehicle-tire, a band of flexible gripping material having an even upper surface and extending around the circumference of the wheel-rim between the rim and tire forming a gripping-cushion for said tire, said flexible band having creased overlapped rounded portions intermediate its ends adapted to prevent said tire from slipping or creeping on said rim, and means for securing said band to the rim, substantially as described.

3. The combination with a vehicle-tire, a band of rubber having an even upper surface and extending around the circumference of the wheel-rim forming a gripping-cushion for said tire, said flexible band having creased
5 overlapping rounded portions intermediate its ends, substantially as described.

Signed at New York, in the county of New York and State of New York, this 21st day of June, A. D. 1904.

CHARLES W. FAITOUTE.

Witnesses:
CHAS. L. WOLF,
M. BENDER.